F. H. SCHULTZ.
SHEAR HOLDING AND OPERATING DEVICE.
APPLICATION FILED JUNE 23, 1915.
1,215,998.
Patented Feb. 13, 1917.
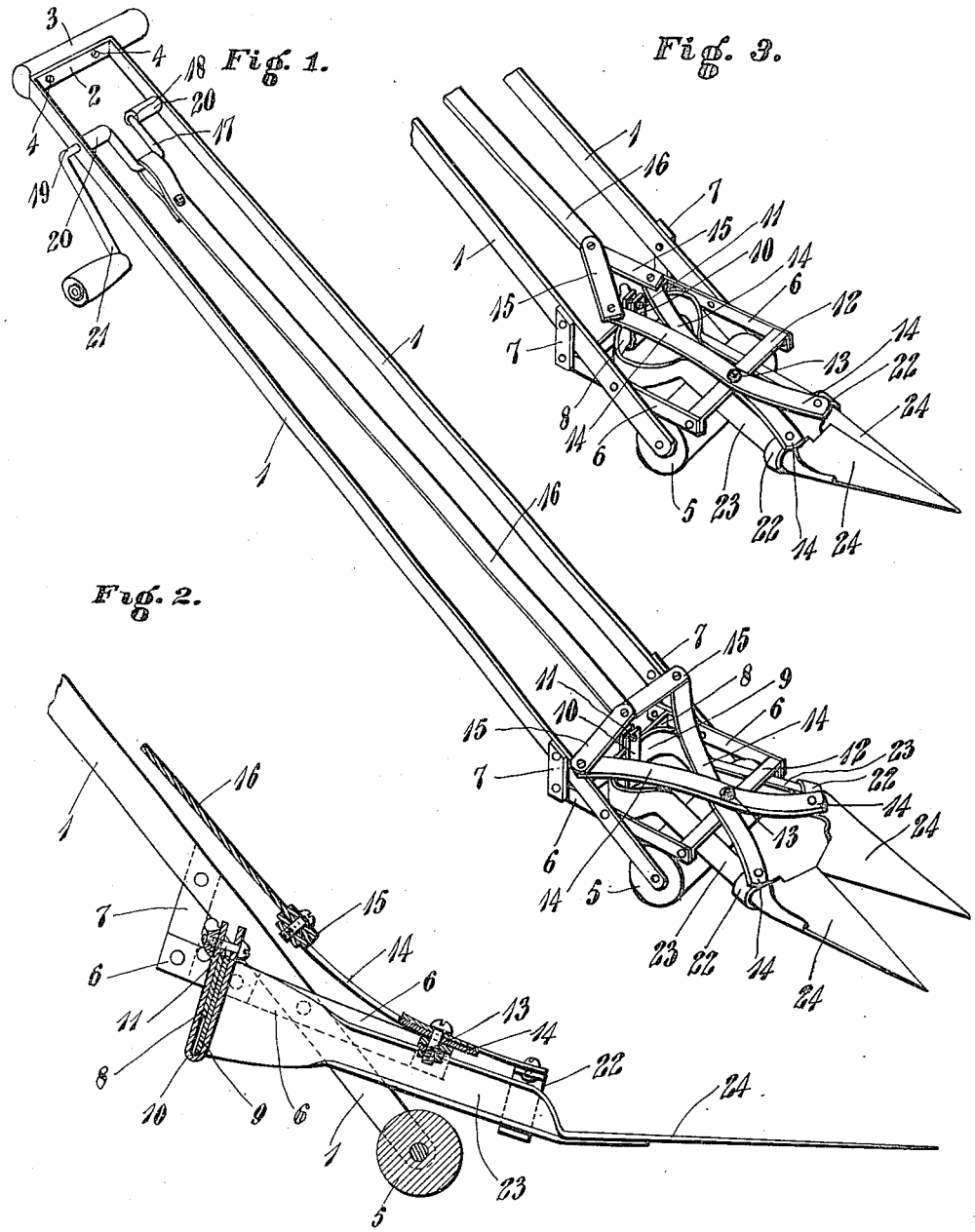

UNITED STATES PATENT OFFICE.

FREDRICK H. SCHULTZ, OF DAYTON, OHIO.

SHEAR HOLDING AND OPERATING DEVICE.

1,215,998.     Specification of Letters Patent.     Patented Feb. 13, 1917.

Application filed June 23, 1915. Serial No. 35,972.

*To all whom it may concern:*

Be it known that I, FREDRICK H. SCHULTZ, a citizen of the United States, and a resident of Dayton, in the county of Montgomery and State of Ohio, have invented certain new and useful Improvements in Shear-Holding and Operating Devices, of which the following is a specification.

My invention relates to cutting apparatus; and its object is to provide means for holding and operating ordinary animal shears for trimming lawns auxiliary to the cutting of the lawn with a lawn mower, thus taking the place of sickles or shears operated directly without any holding means and requiring stooping and tedious application to the work on the part of the operator.

My invention consists in the combination of parts and in the details of construction and arrangement of parts as will herein be more fully described and claimed.

In the drawing:

Figure 1 is a general perspective view of a device embodying my invention, holding the shears in open position;

Fig. 2 is a vertical longitudinal section of the lower end of the device; and

Fig. 3 is a perspective view of the lower part of the device similar to that shown in Fig. 1, but showing the shears held in closed position.

As I prefer to construct my invention, there is a supporting frame comprising two long bars 1 integrally joined by a cross bar 2 at the top, to which cross bar 2 the handle 3 is rigidly secured, as by screws 4. Between the lower ends of these long bars 1 a roller 5 is mounted with spindles bearing in the bars 1 near their lower ends, and it is on this roller 5 that the device travels while being operated. The supporting frame also comprises side bars 6, fixed rigidly inside the long bars 1 just over the roller 5 and extending to the rear and to the front of these bars 1 at a considerable inclination thereto, having their rear ends braced from the bars 1 by braces 7 fixed rigidly to the bars 6 and bars 1 and standing almost upright on the device. Slightly forward of the rear ends of these bars 6, a horizontal cross bar 8 is riveted between them across the machine, being made of a relatively thin strip of metal placed with its edges up and down, and it is against the front flat side of this cross bar 8 that the curved resilient back 9 of the shears bears, being secured to this thin cross bar by a U-shaped clip 10 that has its side parts passing up and flanking this cross bar 8 and the back 9 of the shears, and having its upper ends held together by a clamping screw 11 above the cross bar 10.

Extending across between the front ends of the bars 6 is a front cross bar 12 which is also made relatively thin, but is placed substantially horizontal, with a flat side up, and in its middle it has a pin 13 extending up through it and forming a pivot for levers 14 that cross at this point and extend forwardly and rearwardly out to opposite sides of the device, having pivoted to their upper ends the outer ends of links 15 which have their inner ends pivoted to each other at the middle of the device. These links 15 are here also pivoted to the lower end of a tension bar 16, the upper end of which is looped around a crank 17 that has lateral extensions 18 and 19 bearing in the long bars 1 near their upper ends, with collars 20 around the extensions 18 and 19 between the cranks 17 and the bars 1 to limit end play of the crank and hold it in an intermediate position in the device. At the right side of the device, the extension 19 extends outside the bar 1, and has a crank handle 21 on it.

The levers 14 also have downwardly extending parts from their crossing point out toward the opposite sides of the device, and pivoted on each one of these is a connection clip 22 of U-shape, but laid on its side, one side only of the U-shape being pivoted to the lower side of the respective lever 14 near its lower front end, and the opening of the U being inwardly of the device. Each one of these U-shaped connection clips engages around the outer side of a respective arm 23 of the shears down near the junction of the blade 24 with the arm. The resiliency of the back 9 of the shears holds them open as usual with this kind of shears, and thus holds the lower ends of the levers 14 apart, and consequently holds the upper ends of these levers apart, keeping the links 15 approximately in a straight line across the device, and with the crank 17 pulled down by the connection with the links through the tension bar 16. The crank handle 21 also extends down along with the crank 17.

With the parts in the above positions, the device is used by grasping the handle 3 with the left hand and then rolling the device up to the grass or other object to be cut until the blades 24 flank the object, and then pull backward on the crank handle 21, bringing the blades 24 together against the resistance of the resilient back 9 of the shears. Then, upon release of the crank handle 21, the resilient back 9 will open the shears and bring the other parts back to their original positions, after which the operation may be repeated.

Preferably, the handle 3 is continued out on the left side, or the side opposite the crank handle 21, so that the machine may be held by the left hand over toward the left, thus more effectively balancing the pull on the crank handle and affording the reaction necessary to cause the action of the blades 24. This handle 3 is preferably not continued out on the side where the crank 21 is, because it would here interfere with the convenient operation of the device by being in the way of the right hand in a great many instances, especially where the machine must be used far over to the right of the operator in working up close against walls or fences.

The machine is especially convenient for cutting far in under bushes or other shrubbery which it is desired to avoid cutting or damaging or disarranging in any way, because the cutting members may be pushed far enough in to do the work, while the operator may remain out of contact with the shrubbery or other object under which the cutting is being done.

The shears being of ordinary well known design, may be readily obtained or renewed, or may be removed for sharpening or repairs; while the device itself is so simple as to be little liable to derangement, even after a long period of use.

Having fully described my invention, what I claim as new and desire to secure by Letters Patent is:

1. In a device for holding and operating shears having a back, an elongated supporting frame, and shear-operating means comprising levers with crossed parts pivoted together and pivoted to said supporting frame near the middle of the front end of said frame and extending from front to rear and from side to side of said device, links pivotally connected together and each connected to the rear part of a respective lever, means on the front parts of respective levers to detachably engage with opposite moving side parts of said shears, means to detachably secure the back of the shears to said frame, manipulating means on said frame, and operative connection from said manipulating means to said links where they are pivotally connected together.

2. In a device for holding and operating shears having a back, an elongated supporting frame, and shear-operating means comprising levers with crossed parts pivoted together and pivoted to said supporting frame near the middle of the front end of said frame and extending from front to rear and from side to side of said device, links pivotally connected together and each connected to the rear part of a respective lever, clips pivotally connected to the front parts of respective levers, extending laterally outwardly then downwardly and then inwardly to detachably hook over opposite moving side parts of said shears, means to detachably secure the back of the shears to said frame, manipulating means on said frame, and operative connection from said manipulating means to said links where they are pivotally connected together.

3. In a device for holding and operating shears having a back, an elongated supporting frame, and shear-operating means comprising levers with crossed parts pivoted together and pivoted to said supporting frame near the middle of the front end of said frame and extending from front to rear and from side to side of said device, links pivotally connected together and each connected to the rear part of a respective lever, means on the front parts of respective levers to detachably engage with opposite moving side parts of shears, a cross-bar on said frame to the rear of said clips, a U-shaped clip fixed to said cross-bar near the middle of the device with said parts flanking said cross-bar and adapted to flank the back of said shears, and means to clamp said side parts together to detachably secure the back of the shears to said cross-bar, manipulating means on said frame, and operative connection from said manipulating means to said links where they are pivotally connected together.

4. In a device for holding and operating shears having a back, an elongated supporting frame, and shear-operating means comprising levers with crossed parts pivoted together and pivoted to said supporting frame near the middle of the front end of said frame and extending from front to rear and from side to side of said device, links pivotally connected together and each connected to the rear part of a respective lever, clips pivotally connected to the front parts of respective levers, extending laterally outwardly then downwardly and then inwardly to detachably hook over oppositely moving side parts of said shears, a cross-bar on said frame to the rear of said clips, a U-shaped clip fixed to said cross-bar near the middle of the device with said parts flanking said cross-bar and adapted to flank the back of shears, and means to clamp said side parts together to detachably secure the back of the shears to said cross-bar, manipulating means on said frame, and operative connection from said manipulating means to said links where they are pivotally connected together.

FREDRICK H. SCHULTZ.

Witnesses:
JAMES N. RAMSEY,
CLARENCE PERDEW.